United States Patent [19]

Li et al.

[11] Patent Number: 5,515,361
[45] Date of Patent: May 7, 1996

[54] LINK MONITORING AND MANAGEMENT IN OPTICAL STAR NETWORKS

[75] Inventors: Chung-Sheng Li; Rajiv Ramaswami, both of Ossining, N.Y.

[73] Assignee: International Business Machines Corporation, Armonk, N.Y.

[21] Appl. No.: 393,966

[22] Filed: Feb. 24, 1995

[51] Int. Cl.[6] ................................................ H04L 12/437
[52] U.S. Cl. ............................ 370/15; 370/16.1; 359/121
[58] Field of Search ................................. 370/14, 15, 16, 370/16.1, 60, 94.3; 359/121

[56] References Cited

U.S. PATENT DOCUMENTS

| 5,010,550 | 4/1991 | Hirata | 370/16 |
| 5,179,548 | 1/1993 | Sandesara | 370/16.1 |
| 5,278,824 | 1/1994 | Kremer | 370/15 |
| 5,317,560 | 5/1994 | Ingre et al. | 370/16 |

Primary Examiner—Benedict V. Safourek
Assistant Examiner—Ajit Patel
Attorney, Agent, or Firm—Douglas W. Cameron

[57] ABSTRACT

A method and apparatus for monitoring links in an optical star network along with means for taking down a link in the event of a failure without disruption to other parts of the network, bringing back the link into operation once the failure is corrected, while adhering to eye-safety regulations. More specifically, when one link of a pair of links connecting a station to a star coupler fails, the failure is detected by a monitor and the links of the pair are connected to each other by a switch. This connection of the two links provides a look from the transmitter of the station through the pair of links and to the receiver of the station. This connection also disconnects the station from the star network. When the pair of links again become operable, a signal is detected as passing from the transmitter through the loop and back to the receiver. Detection of the signal by the receiver then results in switching the pair of links back to the star coupler, thereby reconnecting the station to the star network.

4 Claims, 4 Drawing Sheets

NORMAL OPERATION

BLOCKED PORT

LOOP BACK WHEN FAILURE IS DETECTED

LINK MONITORING AND MANAGEMENT IN OPTICAL STAR NETWORKS

DESCRIPTION

1. Technical Field

This invention relates to a reconfigurable fault tolerant star communications network.

2. Description of the Prior Art

To our knowledge the prior art concentrates exclusively on providing such management mechanisms for point-to-point optical transmission links (for example, the open-fiber-control protocol in the Fiber Channel Standard, Annex I, FC-PII 4.3) and not for multipoint-to-multipoint networks.

In a point-to-point link between two stations A and B shown in FIG. 1, the current practice of managing the link is as follows. Each transceiver could be in any of the four states: active state, disconnect state, stop state, and reconnect state. Under normal circumstances a station is in the active state when the transceiver is sending and receiving data. Assume both station A and B are in the active state. If the fiber AB (101) is cut, station B detects a loss of light on that link using its monitor (107), turns off its laser transmitter (108) and enters into the disconnect state. After detecting a loss of light using its monitor (104), Station A turns off its laser transmitter (103) and also enters into the disconnect state. Thus no light emanates from the cut fiber and the eye-safety regulations are satisfied. In order to bring the link back up once it is repaired, an ON-OFF-ON reconnect protocol is usually conducted between station A and B. Station A and B both periodically pulse their laser transmitters (103 and 108 respectively) while in the disconnect state. This pulsing results in an average optical power on the link that is less than that allowed by eye-safety regulations. In this instance once the fiber AB (101) is repaired, Station B's monitor (107) detects these pulses, station B's laser transmitter (108) then responds to station A, and the link then comes up after going through the stop state and the reconnect state.

An optical star network consists of stations interconnected to each other via a passive optical star coupler in the middle of the network. An optical fiber link, called the up link carries signals from each station to the star. The star combines the signals from all the stations and distributes the resulting optical signal equally among all its outputs. Another optical fiber link, called the down link carries the combined signal from an output of the star to each station. In such an operational network, means must be provided to detect link failures and recover from them while adhering to Federal Eye-Safety regulations as well (FDA regulation 21 CFR subchapter J, ANSI laser safety standard Z136.2, IEC Laser Safety Standard 825). These regulations impose a maximum limit the optical power that is allowed to emanate from a cut fiber that is much below typical operating powers on the link. Examples of such networks are Rainbow [1] and Lambdanet [2]. References [1] and [2] are hereby incorporated herein by reference.

Extending the approach for point-to-point links to a multipoint-to-multipoint network does not appear to be straightforward. First, there is the problem of determining the exact location of a failure. For instance, if an up link from station X fails, all stations including X will still detect the presence of light on all their down links. It is not clear a priori as to how this failure can be detected.

Another instance of a failure is when the down link to station X fails. In this case station, X can easily detect the absence of light and determine that the down link has failed. However, other stations may not be aware of this fact and will continue to transmit as usual. This will result in violating the eye-safety regulations on the failed down link. Moreover, it is undesirable to have other stations stop transmission altogether while this link is in the failed state.

SUMMARY OF THE INVENTION

It is an object of this invention to provide a means for detecting the operating condition of each link in a star network, to take it down once a link cut is detected, keep the optical power levels on cut links within eye-safety limits, and to bring the link back up automatically once the cut is restored, all the while not affecting the operation of the other stations in the network, except for the station whose link is cut.

The invention achieves these objectives by providing an optical bypass switch for each station located at the star coupler, along with a means of detecting the presence or absence of light on an up link at the star and on a down link at the station.

This invention could be applied to any star communications network having stations connected to the star coupler of the network by pairs of communication links. A monitor is provided to monitor signals on the links in order to determine failure or successful operation of the links. When a link to a station of the network is determined to have failed, this link will then be connected to another link connected to the station so as to form a loop from the transmitter of the station to the receiver of the station. When the loop is formed, the station is no longer connected to the star coupler of the network. When a certain signal is detected as being transmitted through the entire loop from transmitter, through the first and second links and back to the receiver; the links are interpreted to be operating successfully. In such case, the monitor of the links sends a signal to a switch to disconnect the pair of links from each other to reconnect the links to the star coupler, thereby reconnecting the previously disconnected station from the star communications network.

Note that the loopback of the up and down link achieves two functions: (1) it allows the node to determine for itself when the link comes back up, (2) more importantly it allows other nodes in the network to continue transmission without being interrupted. A major problem in the broadcast network is that if a down link goes down, although that corresponding node can stop transmitting, there is still power coming on to the failed link from other nodes in the network. This is prevented by looping back the up and down links as shown in figure.

DESCRIPTION OF THE PREFERRED EMBODIMENT

Figure 1:
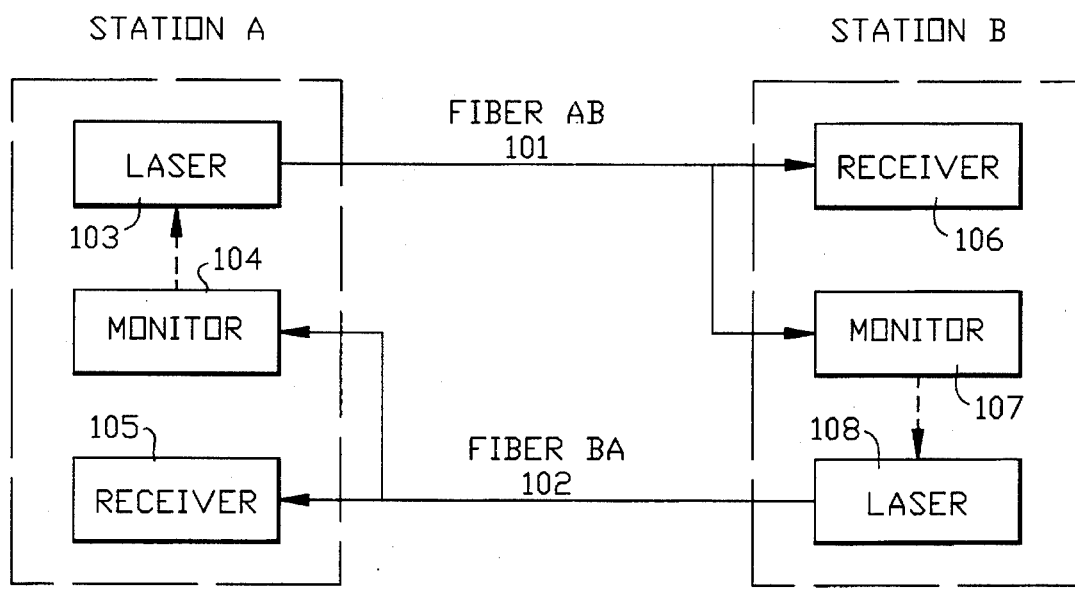
FIG. 1 shows a point-to-point optical communication link and the management mechanisms used therein.
Figure 2:
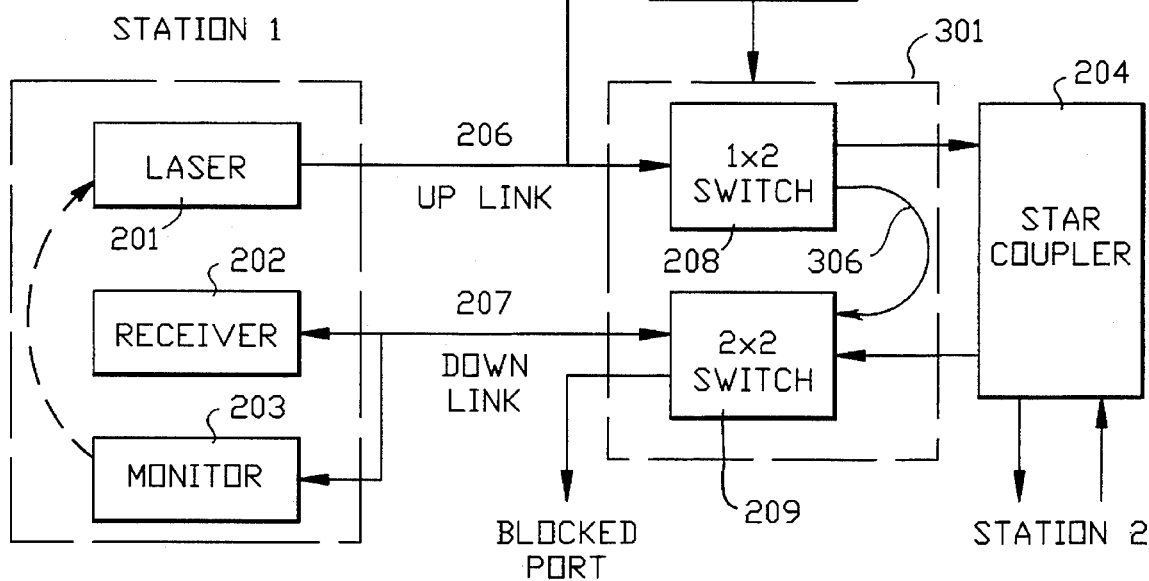
FIG. 2 shows an optical star network along with the preferred embodiment describing the apparatus for managing the links in the network.

Referring to FIG. 2, each station is provided with a Monitor photodiode (203) to detect the presence or absence of light on the down link 207. This monitor is set to detect the presence or absence of light from that station's transmitter. For instance, FIG. 2 shows the configuration for a particular station, station 1, in the network, including its transmitter 201 (assumed to be a laser), receiver 202, and monitor 203. For the receiver and the monitor, a PINFET photodiode is preferable, for the transmitter a distributed feedback laser is preferable. Shown also in FIG. 2 is loopback switch 301 containing optical switches 208 and 209.

In addition, at the input to each port of the star coupler 204, a portion of the power coming in on the up link is tapped off, e.g. 206, and detected using another monitor photodiode 205. This photodiode is set to detect the presence or absence of light on the tip link 207, but is designed not to respond to a periodic pulsing of light from the station's transmitter 201. Such pulsing is used by the transmitter to bring back a link that has failed.

For simplicity we will describe the procedure used for a particular station, station 1. The same procedure is used independently for each station in the network.

Figure 3A:
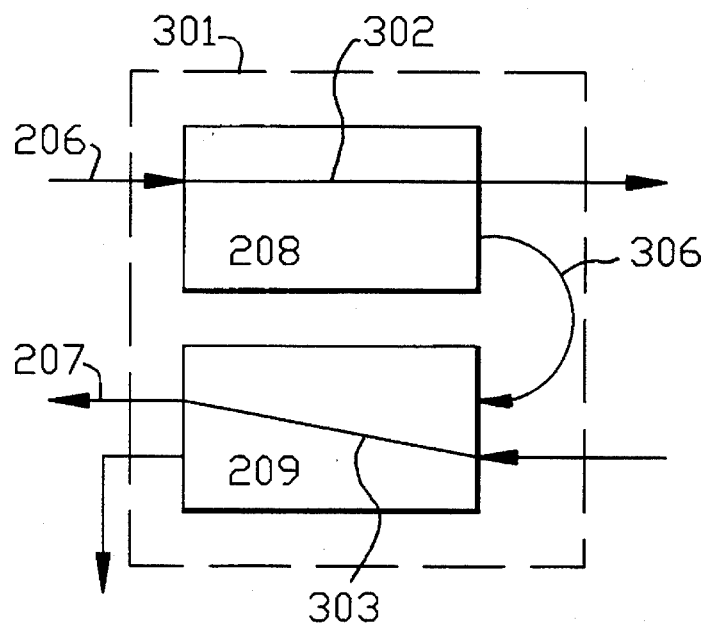
FIGS. 3A and 3B show respectively loopback switch 301 in the normal operation connecting the up and down links to the star coupler, and in the bypass position interconnecting the up and down links to each other.

Referring to FIG. 3A, in the normal mode of operation of the loopback switch 301, optical switch 208 is set in the 'bar' position 302 allowing light from station 1 to go into the star coupler 204. Optical switch 209 is set in the 'cross' position 303 allowing light from the star coupler to be received by station 1.

Figure 3B:
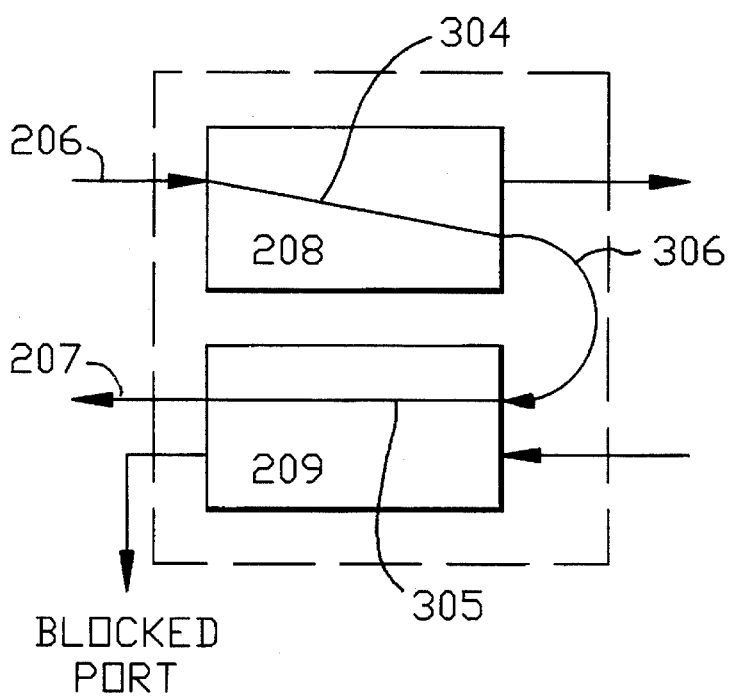

Referring to FIGS. 2 and 3B, if the up-link 206 fails, the monitor photodiode 205 detects the loss of light and sets switch 208 in the 'cross' position 304 and switch 209 in the 'bar' position 305. In this bypass configuration, the up link 206 is connected to the down link 207 through connector 306 so that station 1's transmitter 201 is connected to its receiver 202. The optical switches 208 and 209 could preferably be implemented using fiber switches, or directional couplers using $LiNbO_3$. The blocked port of switch 209 is used to indicate an unused port.

If the down-link 207 fails, the station detects loss of light using its monitor photodiode 203 and immediately turns off its transmitter 201. This is then detected as loss of light by the monitor photodiode 205 on the up-link 206. The switches 208 and 209 are then set as described above and shown in FIG. 3B.

Thus, once either the up-link or down-link fails, the station's transmitter is turned off and the optical switches are set in the bypass position FIG. 3B.

The station then periodically sends light pulses as in the standard procedure for point-to-point links. When the failed link is repaired (either the up or down or both), the station can then receive its own pulses and decide that the link is up. Upon detection of its own pulses, the node then begins transmitting a regular stream of light (not pulses). This regular stream signals the monitor photodiode on the up link to reset the switches (as in FIG. 3A) so that the up link and down link are both connected to the appropriate ports in the star coupler.

Figure 4:
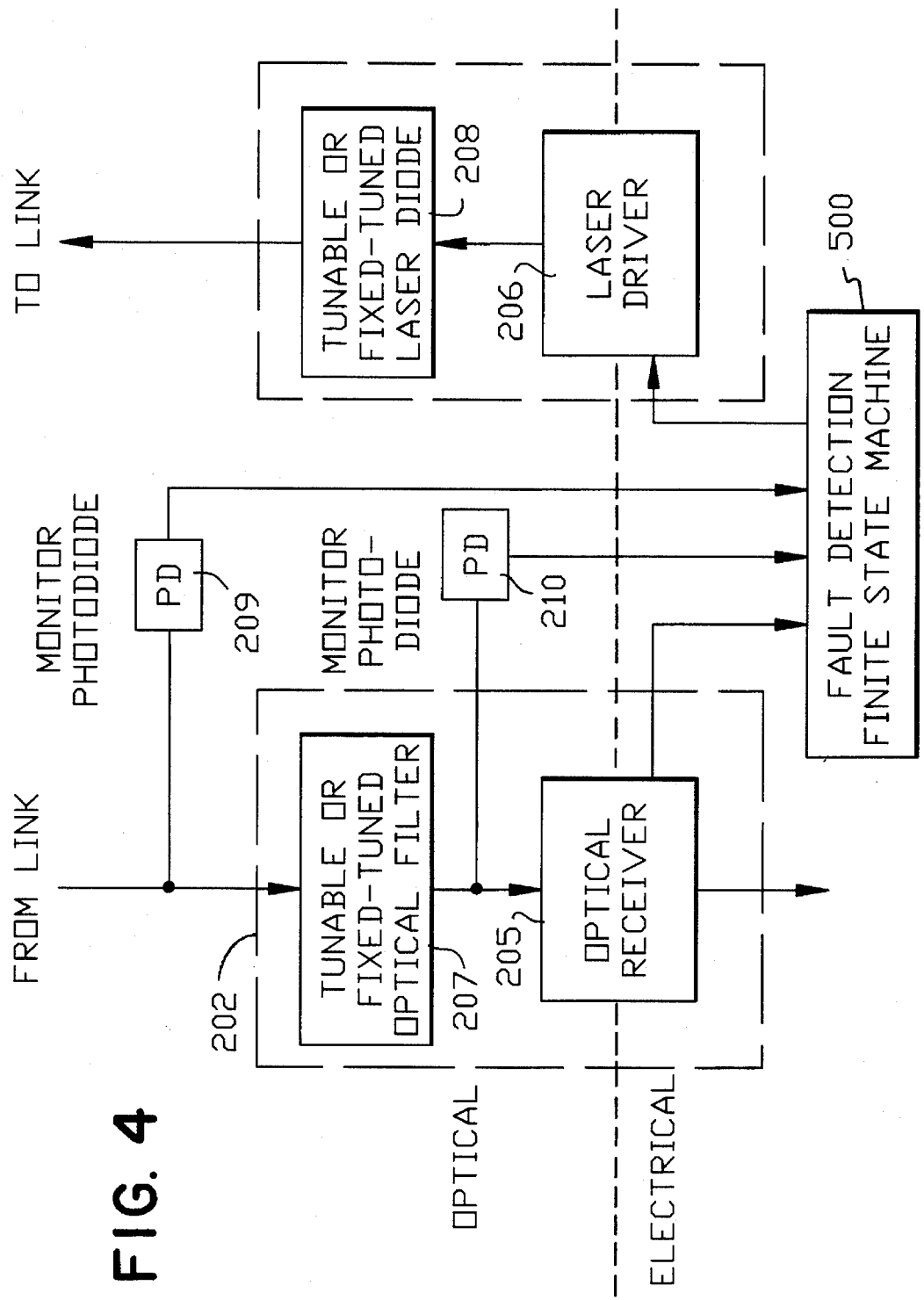
FIG. 4 illustrates in slightly more detail the major components of the station. Not shown is the electrical portion of the station which receives electrical signals from the optical receiver 205 and sends electrical signals to the laser driver 206.

Referring to FIG. 4, an example of the optical transmitter 201 consists of a laser driver 206 and a tunable or fixed-tuned laser diode which performs the electrical-to-optical conversion. The tunable or fixed-tuned receiver 202 consists of a tunable or fixed-tuned optical filter followed by an optical receiver which performs the optical-to-electrical conversion. Monitor photodetectors 209 and 210 are used for determining the correct functioning of the tunable/fixed-tuned optical filter. When photodetector 209 detects light and 210 does not, the optical filter is not functioning correctly and the end node will not enter into the Disconnect state. The fault detection and recovery finite state machine (500) taps the signals from the optical receiver, and sends control signals to the laser driver.

Figure 5:
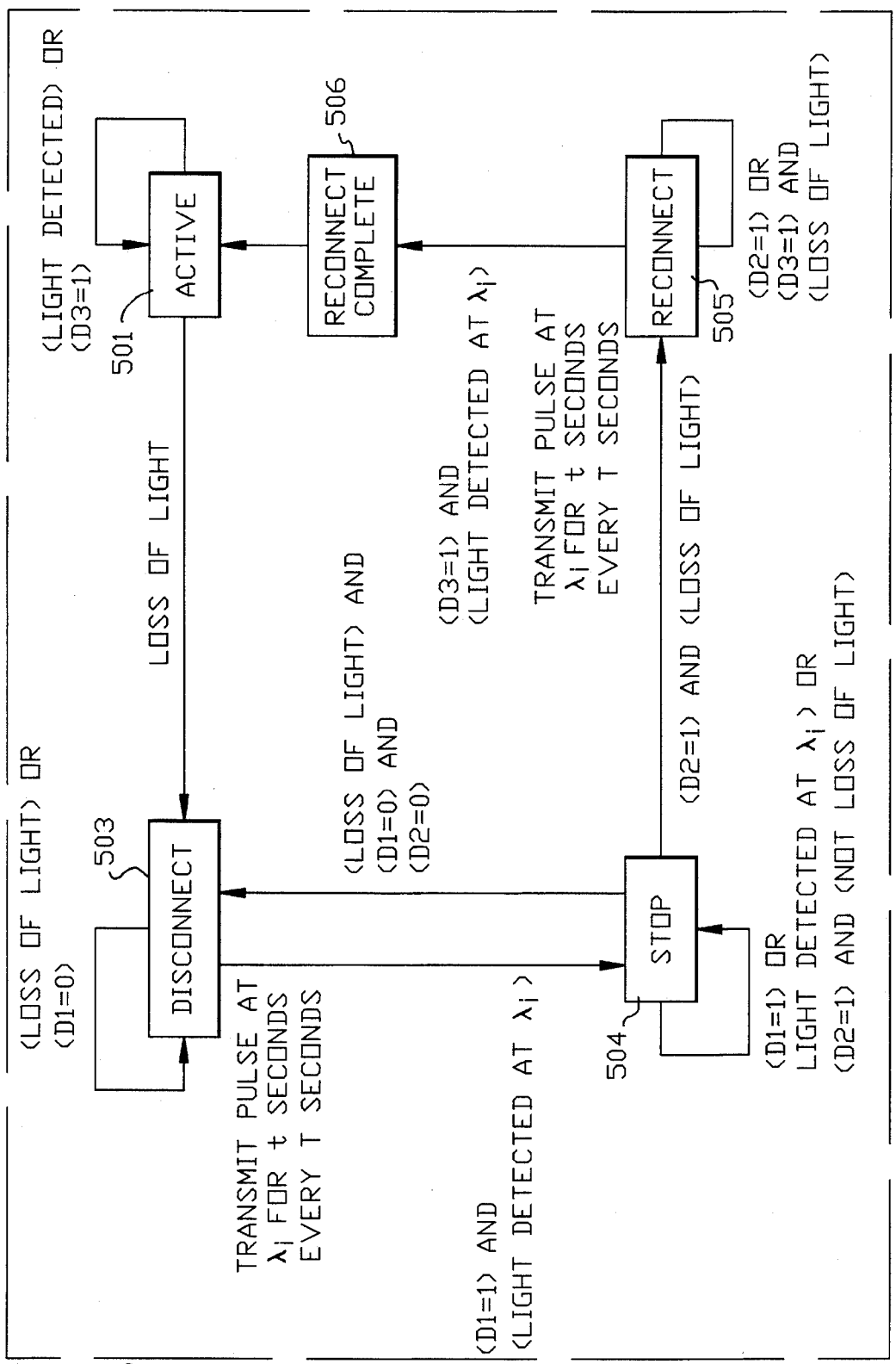
FIG. 5 illustrates the operation of the state machine used to control switches 208 and 209 for connecting switches 208 and 209 for connecting and disconnecting a station to a star coupler.

Referring to FIG. 5, the state transitions in the fault detection and recovery finite state machine 500 is as follows:

The end node is in the Active state (501) when it is engaged in normal operation. When a loss-of-light condition is detected From the optical receiver, it first enters into the disconnect state (503), and the optical transmitter is directed to emit light at a wavelength that the receiver can listen to for t seconds every T seconds. The duty cycle (t/T) is chosen in order to satisfy the laser eye safety requirements. Note that the loopback switch 301, comprising optical switches 208 and 209, on the far end of the star coupler is also in the loopback mode (See FIG. 3B) as soon as the loss of light condition is detected.

As soon as the light is detected at the receiver, the end node enters into the Stop state 504. The laser is completely shut off in this state. If no light is detected, the end node enters into the Reconnect state 505. The transmitter starts pulsing again while in this state. If light is detected at the receiver, the end node could enter the Reconnect Complete state (506) to allow the optical switch to reconnect in the normal mode. After a short time interval, the end node enters into the Active state again (501).

This ON-OFF-ON protocol is different from the one used for the point-to-point links in that there are two end nodes involved in the protocol during a link recovery process in a point-to-point link, while only one node is engaged in this protocol in the protocol disclose in this invention. Furthermore, a self-diagnostic procedure is invoked at the beginning of the protocol in order to confirm that everything within an end node is functioning properly.

REFERENCES

[1] F. J. Janniello, R. Ramaswami and D. G. Steinberg. A prototype circuit-switched multi-wavelength optical metropolitan-area network. IEEE/OSA J. Lightwave Tech., vol. 11, May/June 1993, pp. 777–782.

[2] M. S. Goodman, H. Kobrinski, M. Vecchi, R. M. Bulley and J. M. Gimlett. The LAMBDANET multiwavelength network: architecture, applications and demonstrations. IEEE J. Selected Areas in Commun. vol. 8, no. 6, Aug. 1990, pp. 995–1004.

Having thus described our invention, what we claim as new and desire to secure by Letters Patents is:

1. In a star communications network having a star coupler, and a plurality of stations connected to said star coupler, each station being connected to said star coupler by a first and second link, a method of reconfiguring said network in response to failure or successful operation of said first or second link, said method for each station comprising:

a. monitoring said first and second link for first signals being transmitted thereon, said first and second link being monitored at said star coupler and at a receiver of said each station respectively, said first signals being transmitted from said star coupler or said each station;

b. disconnecting said first and second link from said star coupler and connecting them to each other when said first signals are not detected on said first or second link, forming a loop from a transmitter of said each station through said first and second link to a receiver of said each station; and c. reconnecting said first and second link to said star coupler and disconnecting them from each other upon detection, by said receiver, of second selected signals being transmitted from said transmitter and through said loop, thereby reconnecting said station to said star communications network upon successful operation of said first and second link.

2. In a star communications network having a star coupler, a plurality of stations connected to said star coupler, each station being connected to said star coupler by a first and second link, an apparatus for reconfiguring said network in response to failure or successful operation of said first or second link, said apparatus for each station comprising:

a. means for monitoring said first and second link for first signals being transmitted thereon, said first and second link being monitored at said star coupler and at a receiver of said each station respectively, said first signals being transmitted from said star coupler or said each station;

b. means for disconnecting said first and second link from said star coupler and connecting them to each other when said first selected signals are not detected on said first or second link, thereby forming a loop from a transmitter of said each station through said first and second link to a receiver of said each station; and c. means for reconnecting said first and second link to said star coupler and disconnecting them from each other upon detection, by said receiver, of second signals being transmitted from said transmitter and through said loop, thereby reconnecting said each station to said star communications network upon successful operation of said first and second link.

3. In a star communications network having a star coupler, and a plurality of stations connected to said star coupler, each station being connected to said star coupler by a first and second link, an apparatus for reconfiguring said network in response to failure or successful operation of said first or second link, said apparatus for each station comprising:

a. a monitor for monitoring said first and second link for the presence of first selected signals being transmitted thereon, said first and second link being monitored at said star coupler and at a receiver of said each station respectively, said first signals being transmitted from said star coupler or said each station; and b. a switch for disconnecting said first and second link from said star coupler and connecting them to each other when said first selected signals are not detected by said monitor on said first or second link, thereby forming a loop from a transmitter of said each station through said first and second link to a receiver of said each station, said switch also reconnecting said first and second link to said star coupler and disconnecting them from each other upon detection, by said receiver, of second selected signals being transmitted from said transmitter and through said loop, thereby reconnecting said each station to said star communications network upon successful operation of said first and second link.

4. An automatically reconfigurable fault tolerant star communications network, comprising:

a. a shared medium device;

b. a plurality of stations;

c. a plurality of links;

d. a plurality of monitors, each monitor being connected to an end of said links for detecting the presence of signals being transmitted on at least said one link; and e. a plurality of loopback switches, each loopback switch being connected to one of said monitors and a pair of said links, which pair is connected to one of said stations, wherein said each loopback switch interconnects a said pair of links connected to itself when its connected monitor, of said monitors, detects no first selected signals, of said signals, being transmitted on said pair of links, thereby disconnecting said each station, of said stations from said shared medium device when either link of said pair has failed, and wherein said each loopback switch reconnects said pair of links to said shared medium device when its monitor detects second selected signals of said signals being transmitted on latter said pair of links, thereby reconnecting a station, of said stations, to said shared medium device when latter said pair are operating successfully.

\* \* \* \* \*

UNITED STATES PATENT AND TRADEMARK OFFICE
CERTIFICATE OF CORRECTION

PATENT NO. : 5,515,361
DATED : May 7, 1996
INVENTOR(S) : Chung-Sheng Li and Rajiv Ramaswami It is certified that error appears in the above-indentified patent and that said Letters Patent is hereby corrected as shown below:

Column 1,
Before "Technical Field" insert the following:

> The invention herein was made with Government support under Contract MDA972-92-C-0075 awarded by the Advanced Research Projects Agency (ARPA). The Government has certain rights in this invention.

Signed and Sealed this

Thirty-first Day of December, 1996

Attest:

BRUCE LEHMAN

Attesting Officer　　　Commissioner of Patents and Trademarks